US005995846A

United States Patent [19]

Jakobsen

[11] Patent Number: 5,995,846

[45] Date of Patent: Nov. 30, 1999

[54] TIME DISPLAY IN A MOBILE TELEPHONE

[75] Inventor: Jens J. Jakobsen, Bochum, Germany

[73] Assignee: Nokia Mobile Phones, Ltd., Espoo, Finland

[21] Appl. No.: 08/922,764

[22] Filed: Sep. 3, 1997

[30] Foreign Application Priority Data

Sep. 4, 1996 [DE] Germany .......................... 196 35 922

[51] Int. Cl.[6] ................................................ H04B 1/00

[52] U.S. Cl. .......................... 455/517; 455/566; 455/550; 455/181.1; 455/466; 368/47

[58] Field of Search ................................ 368/10, 13, 47; 455/181, 550, 566, 517, 186.1, 231, 403, 422, 575, 96; 370/252

[56] References Cited

U.S. PATENT DOCUMENTS

| | | | |
|---|---|---|---|
| 4,204,167 | 5/1980 | Liu | 455/231 |
| 5,590,092 | 12/1996 | Fehnel | 368/10 |
| 5,655,218 | 8/1997 | Smolinske | 455/566 |
| 5,740,129 | 4/1998 | Frampton | 368/10 |
| 5,758,278 | 5/1998 | Lansdowne | 455/343 |

OTHER PUBLICATIONS

European Telecommunications Standards Institute, Jul. 1995, draft pr ETS 300 175–3, Radio Equipment and Systems (RES); Digital European Cordless Telecommunications (DECT); Common Interface (CI); Part 3: Medium Access Control (MAC) layer.

*Primary Examiner*—William G. Trost
*Assistant Examiner*—Sonny Trinh
*Attorney, Agent, or Firm*—Perman & Green, LLP

[57] ABSTRACT

The invention relates to a method and a device for displaying the time in a mobile telephone, the intention being that there should not be a clock module in said mobile telephone and that the standard used for the communication between the mobile telephone and its base station will not be modified. For this purpose, a counter signal which is transmitted by the base station is initialized in such a way that it always has a specific counter reading at a specific time, as a result of which the time can be calculated in a mobile telephone on the basis of this received counter reading.

17 Claims, 3 Drawing Sheets

TIME DISPLAY IN A MOBILE TELEPHONE

The invention relates to a method and a device for displaying the time in a mobile telephone which communicates via a base station, a consecutive counter reading of a base-station counter, which counts in a continuous loop from one specific value to another specific value, being transmitted from the base station to the mobile telephone.

In conventional mobile telephones, the time is either not displayed, or is displayed by means of a clock module integrated in the mobile telephone. Such a clock, which is additional to the normal functionality of the mobile telephone, causes additional complexity of the circuits and requires a constant power supply. Since it is to be ensured that mobile telephone consume as little power as possible, the integration of a clock module into a mobile telephone is not desired.

Furthermore, the integration of a separate clock module in a mobile telephone gives rise to the problem that, owing to synchronism fluctuations of the individual clock modules, the individual mobile telephones of a system with one base station and a plurality of mobile telephones may display different times.

Therefore, the invention is based on the object of making it possible to display the time in mobile telephones more precisely and in a more energy-efficient fashion.

The means of achieving this object in terms of the method are presented in the characterizing part of Patent claim 1 and the means of achieving in terms of the device are presented in the characterizing part of Patent claim 13. Advantageous refinements and developments of the invention are respectively defined in the dependent patent claims below.

A method for displaying the time in a mobile telephone is characterized according to the invention in that a consecutive counter reading of a base-station counter, which counts in a continuous loop from one specific value to another specific value, is transmitted from the base station to the mobile telephone, the time is calculated from the received counter reading in the mobile telephone, and the calculated time is displayed in the mobile telephone.

This method makes it possible to display the time in a mobile telephone very easily and with very little additional complexity. To do this, all that is necessary is for one counter reading of a counter which is present in the base station and which counts over at least one day to be transmitted from the base station to a mobile telephone. This requirement is provided in the defined standards for mobile telephones, for example in the DECT Standard. For this reason, to display the time it is not necessary to transmit any additional information from the base station to the mobile telephone, and the standard used for communication between the base station and a mobile telephone does not need to be changed or modified. If the counter reading is set up in such a way that it always has a specific value at a specific time, the specific time can be calculated again from this transmitted specific value in the mobile telephone. In order for this requirement to be fulfilled, the counter in the base station must be reset at a specific point in time. This takes place preferably when a call is not being made. The further advantages resulting from this are that no power is consumed when the telephone is in the switched-off state and that a plurality of telephones connected to one base station display the same time.

In one advantageous refinement of the method according to the invention, a mobile telephone receives the counter reading from the base station only once, then initializes an internal counter and increments the counter reading there, after which the time in the mobile telephone is calculated on the basis of this internal counter reading.

As a result of this advantageous refinement of the method according to the invention, the mobile telephone does not always have to filter out the received counter reading, but rather it is sufficient to filter out an item of information which indicates a discontinuous or sudden change in the counter reading. Once the counter reading of the mobile telephone has been made to correspond to that of the base station, the counter in the base station and that of the mobile telephone have the same value. Such an initialization takes place in the mobile telephone preferably when the mobile telephone has been synchronized with the broadcast carrier of the base station. In this way, a switched-on mobile telephone initializes its counter reading even if the base unit changes the counter reading and then interrupts the transmission of the broadcast carrier for a specific time.

If the mobile telephone and the base station communicate using the DECT Standard, the counter reading of the multiframe counter can preferably be used. The latter counts from 0 to $2^{24}-1$, which corresponds to a running time of 31 days and 1.65 hours, since the counter reading changes once every 160 ms. Preferably after counting for 30 days, the counter reading of the multiframe counter is set in the base station to a value which corresponds to the counter reading 30 days earlier. Once the counter reading has been initialized in a mobile telephone, it is sufficient if the internal counter of the mobile telephone is incremented whenever a multiframe is received. If, for example, the paging signal, which is received by the mobile telephone every four multiframes, indicates the change in the counter reading, it is also possible to allow the counter always to increment by 4, and this corresponds to a time change of $4\times160$ ms=640 ms.

A communications system with one base station and at least one mobile telephone having a display and a time display is characterized according to the invention in that a counter, which counts in a continuous loop from one specific value to another specific value, and a transmission device for transmitting the counter reading from the base station to a mobile telephone are present in the base station, a device which can initialize or reset the counter reading at a specific time is present in the base station, and a device for calculating the time from the received counter reading is present in the mobile telephone.

According to one advantageous development, the device according to the invention is characterized in that in the mobile telephone there is also an internal counter which is initialized whenever the mobile telephone has been synchronized to the broadcast carrier of the base station and which is incremented on the basis of signals transmitted by the base unit, and the device for calculating the time can also calculate the time by means of the counter reading of the internal counter.

The invention and advantageous details are explained in more detail below in exemplary embodiments with reference to the drawings, in which.

Figure 1:
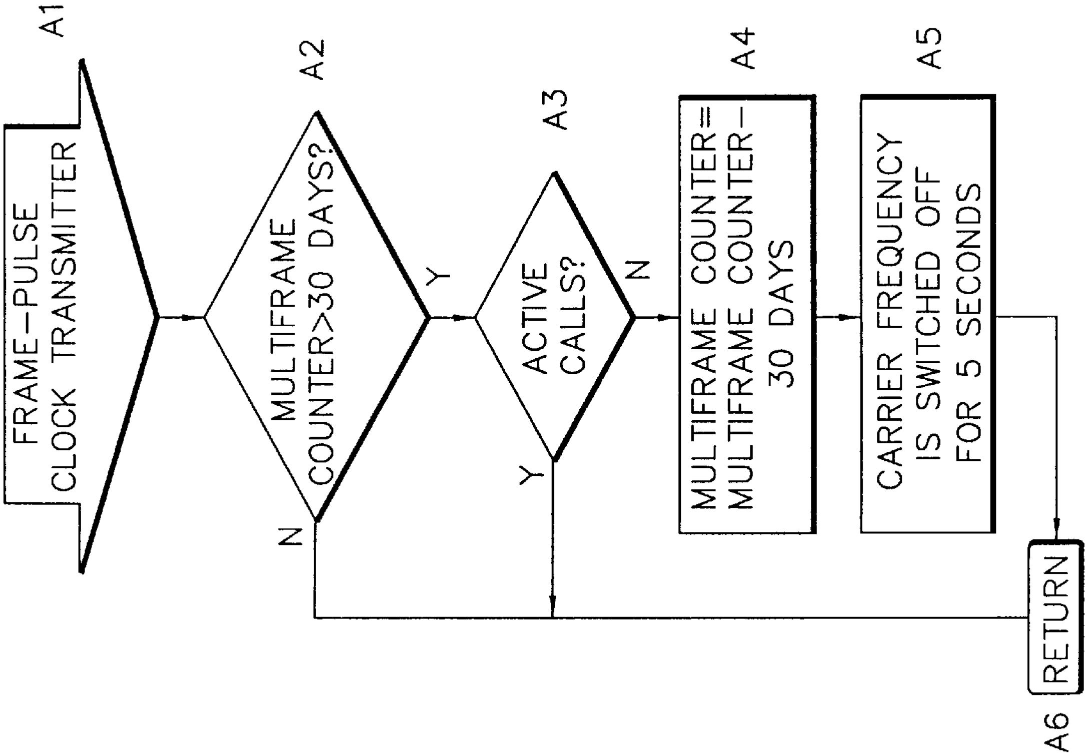
FIG. 1 shows a base station for a mobile telephone according to the DECT Standard, and a flowchart which represents the resetting of the multiframe counter.
Figure 1:
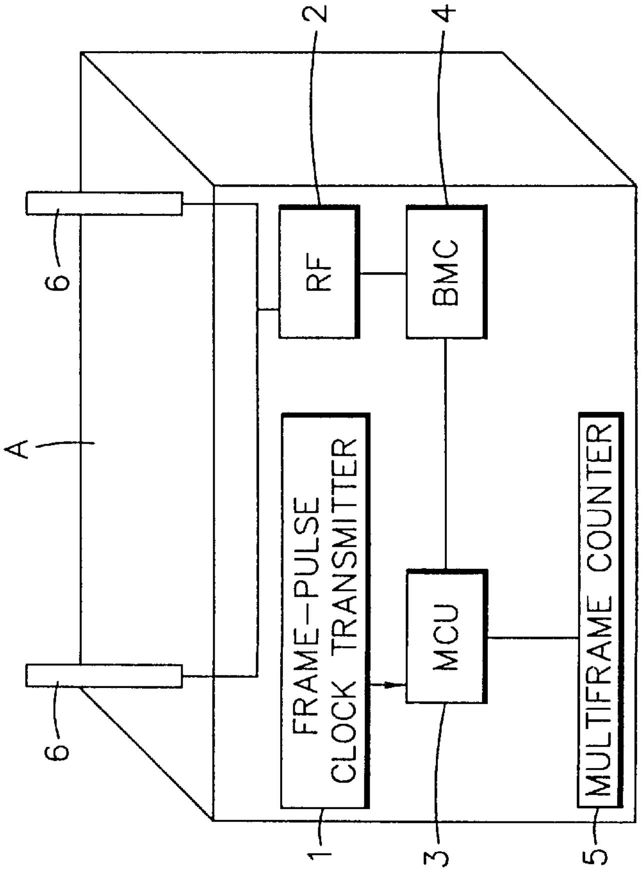

The left-hand side of FIG. 1 shows an exemplary DECT base station A with the assemblies which are necessary for representing the time on an associated mobile telephone. Here, a multiframe counter 5 is connected to a microcontroller unit 3, which is connected to the antennas 6 of the base station A via a burst mode controller 4 and an RF component 2. Furthermore, a frame pulse clock transmitter 1 is connected to the microcontroller unit 3. Once the multiframe counter 5 has been initialized to a specific time, it simply counts each transmitted multiframe in accordance with its function taking into account the process represented on the right-hand side of FIG. 1 by means of a flowchart. The flowchart shown on the right-hand side of FIG. 1 represents a monitoring routine for resetting the counter reading of the multiframe counter 5. At each pulse transmitted from the frame pulse clock transmitter 1 in a step A1, it is tested, in a step A2, whether the counter reading of the multiframe counter 5 corresponds to a value which is greater than 30 days. If this is not the case, the system branches into a step A6 in which the next pulse of the frame pulse clock transmitter 1 is waited for. On the other hand, if it is detected in step A2 that the value of the multiframe counter is greater than 30 days, it is checked in a step A3 whether active calls are currently taking place. If this is the case, the step A6 is branched into again. However, if no active calls are taking place in step A3, in a step A4 the counter reading of the multiframe counter 5 is decremented by 30 days. Then, in a step A5 the broadcast carrier is switched off for approximately 5 seconds, so that the mobile telephones B connected to the base station A resynchronize and calculate their time again from the counter value present at that particular time.

Figure 2:
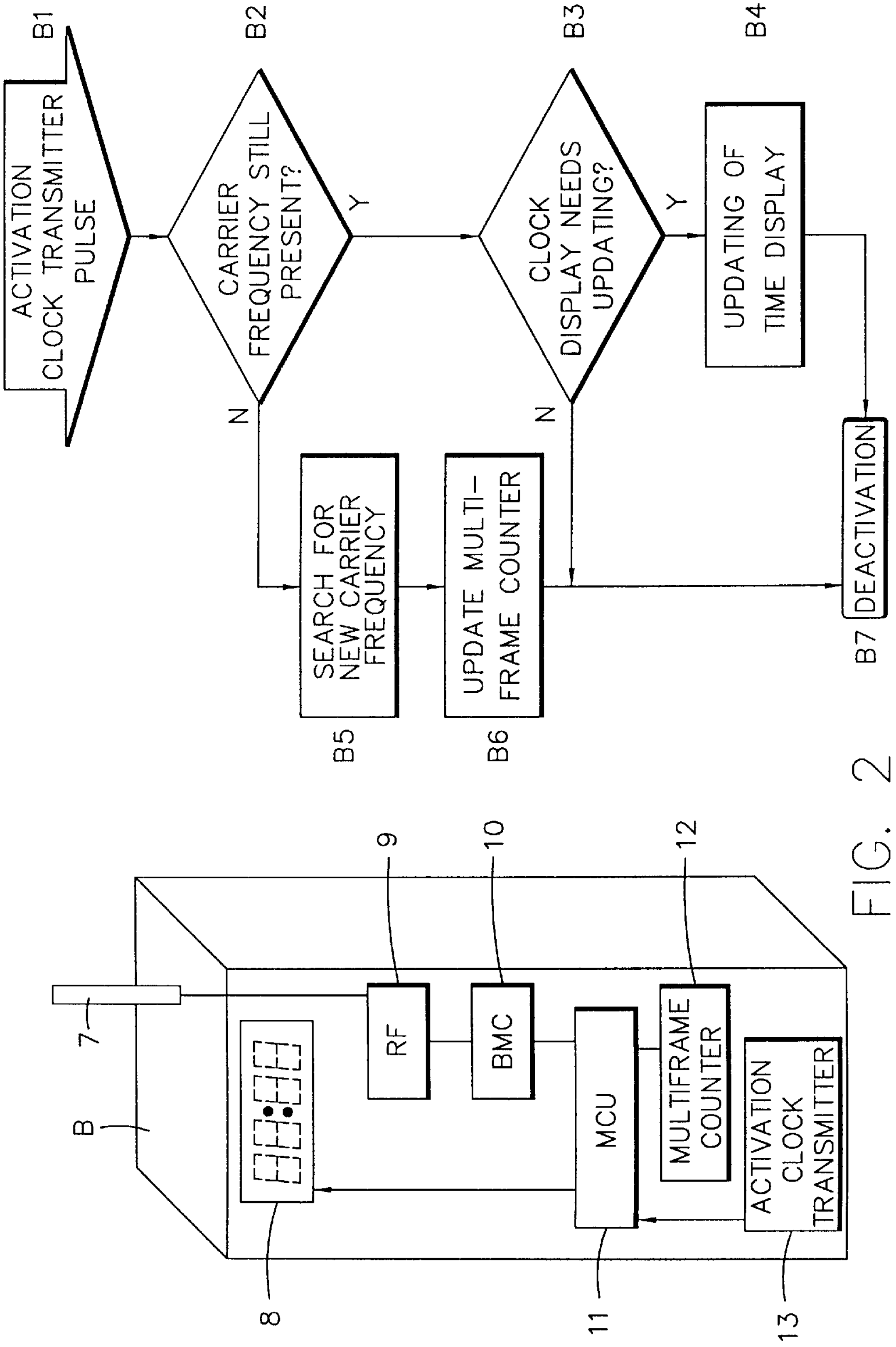
FIG. 2 shows a mobile telephone which operates according to the DECT Standard, and a flowchart which represents the updating of the time display.

The left-hand side of FIG. 2 shows a mobile telephone B which operates according to the DECT Standard and has the assemblies necessary for displaying the time according to the invention. Information transmitted from the base station A is received by a microcontroller unit 11 via an antenna 7, an RF component 9 and a burst mode controller 10. The time is represented on a display 8 by said microcontroller unit 11 by means of an activation clock transmitter 13 and a multiframe counter 12. The time on the display 8 is updated in the way illustrated by the flowchart shown on the right-hand side of FIG. 2. If a pulse is transmitted by the activation clock transmitter in a step B1, it is checked in a step B2 whether the broadcast carrier is still present. If this is not the case, in a step B5 a new broadcast carrier is searched for and the counter reading of the multiframe counter is then updated in a step B6. This takes place by adopting the counter reading transmitted by the base station. Then, in a step B7 the system waits for the next pulse from the activation clock transmitter 13. If it is detected in the step B2 that the broadcast carrier is still present, it is checked in a step B3 whether the display of the hours and/or minutes has to be updated. If this is not the case, the system branches back into the step B7. However, if the time display has to be updated, this is done in a step B4 before the next pulse of the activation clock transmitter 13 is waited for again in step B7.

According to the invention, the counter 5 of the base unit A can be started with the value 0 at any desired time of a day, provided a mobile telephone B which wishes to calculate a time from the received counter reading knows this particular point in time. If the multiframe counter 5 is started with the value 0 at midnight, for example, and if the mobile telephone B receives the value 1000 from the multiframe counter 5, the time is calculated as 1000×160 ms=160 s after midnight, that is too say 0:02:40 hours.

Figure 3:
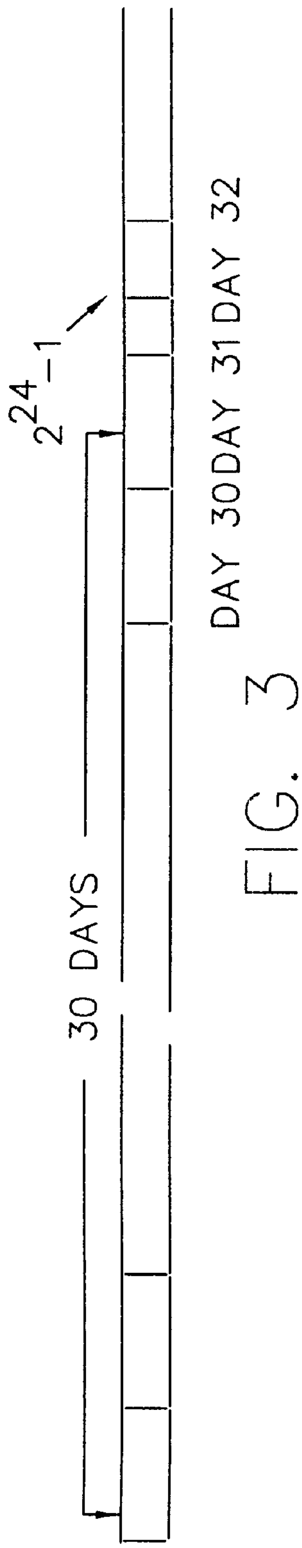
FIG. 3 shows a diagram for representing the resetting of the counter in the base station.

Since the counter does not count an integral number of days, it must be reset in advance towards the end of its counting run. Normally, the multiframe counter 5 will count from 0 to 16,777,215 ($=2^{24}-1$), the value which follows the highest counter reading being again 0. According to the invention it is proposed to reset the counter reading after 30 days have expired to a value which is precisely 30 days in the past. This procedure is illustrated schematically in FIG. 3. In this way, it is also not necessary to reset the counter at a specific point in time, but instead a time period of over a day remains for this in practice. This is a particular advantage, since the multiframe counter according to the DECT Standard is used as an input parameter of a coding algorithm used during a call. So that calls do not need to be interrupted, the counter should only be reset if no calls are actually taking place. This can be detected in the base unit. Such resetting is possible, since, as stated above, the counter does not have to be reset to a specific point in time.

Figure 4:
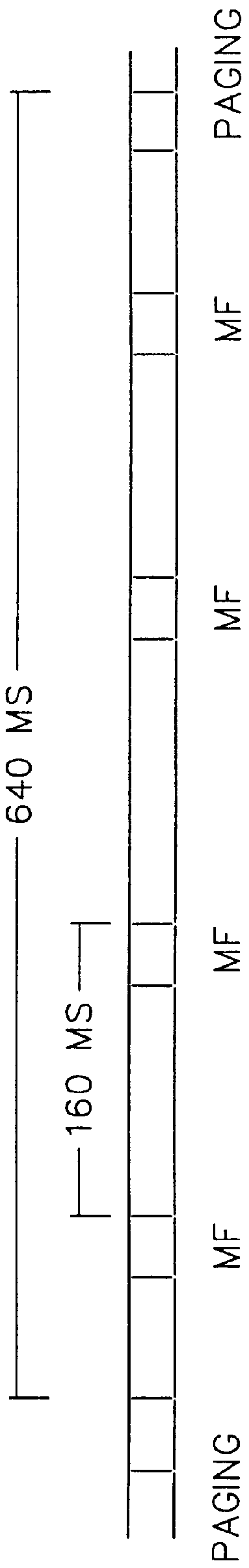
FIG. 4 shows a representation which shows the relationship between the multiframes transmitted in the DECT Standard and the paging signal in an operating mode in which the paging signal is received only in every fourth multiframe.

In order to save power, there is provision according to the invention for a mobile telephone to read out the counter reading of the multiframe counter only once and then increment it locally. This incrementation can proceed automatically, since a mobile telephone receives a paging signal every 640 ms, after which the counter can be incremented by 4. The relationship between the multiframes transmitted according to the DECT Standard and the paging signals is illustrated in FIG. 4 for one mode of operation. In other modes of operation, the paging signal can be received at different time intervals in accordance with the DECT Standard. If the counter in the base station is then reprogrammed, for example because the counter reading is greater than 30 days or because a user sets a new time, the synchronized mobile telephones have to be informed, so that they set the correct time. According to the invention, it is proposed for this that all the mobile telephones are forced to carry out resynchronization, as a result of which the counter reading of the multiframe counter is read out and the current time of day is calculated and displayed. Such resynchronization can be carried out by briefly switching off the broadcast carrier of the base station, as a result of which the switched-on mobile telephones resynchronize after finding a new carrier frequency.

The precision of the time display realized in this way is in the range of 160 ms if every counter reading of the multiframe counter is evaluated, and depends essentially on the precision of the clock transmitter in the base station.

I claim:

1. Method for displaying the time in a mobile telephone (B) which communicates via a base station (A), comprising the steps of:

transmitting a consecutive counter reading of a base-station (A) counter (5), which counts in a continuous loop from one specific value to another specific value, from the base station (A) to the mobile telephone (B), calculating the time in the mobile telephone (B) from the received counter reading, and displaying the calculated time in the mobile telephone (B), and at each run through the loop, every possible transmitted counter reading corresponds to a specific time.

2. Method according to claim 1, characterized in that the counter (5) in the base station (A) is reset at a specific point in time.

3. Method according to claim 1, characterized in that the base station (A) resets the counter reading if a call is not being made.

4. Method according to claim 1, characterized in that a mobile telephone (B) receives the counter reading from the base station (A) only once, then initializes an internal counter (12) and increments the counter reading there, after which the time is calculated in the mobile telephone (B) on the basis of this internal counter reading.

5. Method according to claim 4, characterized in that the internal counter reading is incremented on the basis of information which is transmitted by the base station (A).

6. Method according to claim 4, characterized in that, after the counter reading has been reset, the base station (A) switches off the broadcast carrier for a specific time.

7. Method according to claim 6, characterized in that the counter reading is received once by the mobile telephone (B) whenever the mobile telephone has been synchronized to the broadcast carrier of the base station.

8. Method for displaying the time in a mobile telephone (B) which communicates via a base station (A), comprising the steps of:

transmitting a consecutive counter reading of a base-station (A) multiframe counter (5), which counts in a continuous loop from one specific value to another specific value, from the base station (A) to the mobile telephone (B);

calculating the time in the mobile teleohone (B) from the received counter reading;

displaying the calculated time in the mobile telephone (B);

the mobile telephone (B) communicates with the base station (A) using the DECT Standard, and the transmitted counter reading of the multiframe counter is used as a consecutive counter reading.

9. Method according to claim 8, characterized in that the counter reading of the multiframe counter (5) in the base station (A) is reset after 30 days to a value which corresponds to the counter reading 30 days earlier.

10. Method according to claim 8, characterized in that the internal counter (12) of the mobile telephone (B) is incremented by a specific value at each received paging signal.

11. Communications system having a base station (A) and at least one mobile telephone (B) having a display (8) and a time display, comprising:

a counter (5), which counts in a continuous loop from one specific value to another specific value, in the base station (A), a transmission device (2, 4, 6) for transmitting the counter reading from the base station (A) to a mobile telephone (B), in the base station (A), and wherein, at each run through the loop, every possible transmitted counter reading corresponds to a specific time, a device (1, 3) which can initialize or reset the counter reading at a specific times in the base station (A); and a device (11, 13) for calculating the time from the received counter reading, in the mobile telephone (B).

12. Device according to claim 11, characterized in that an internal counter (12), which is initialized whenever the mobile telephone has been synchronized to the broadcast carrier of the base station and which increments on the basis of signals transmitted from the base station, is also present in the mobile telephone (B), and the device (11, 13) for calculating the time can also calculate the time using the counter reading of the internal counter (12).

13. Method for displaying the time in a mobile telephone (B) which communicates via a base station (A), comprising the steps of:

transmitting a consecutive counter reading of a base-station (A) counter (5), which counts in a continuous loop from one specific value to another specific value, from the base station (A) to the mobile telephone (B), calculating the time in the mobile telephone (B) from the received counter reading, and displaying the calculated time in the mobile telephone (B), and resetting the counter (5) in the base station (A) at a specific point in time.

14. Method for displaying the time in a mobile telephone (B) which communicates via a base station (A), comprising the steps of:

transmitting a consecutive counter reading of a base-station (A) counter (5), which counts in a continuous loop from one specific value to another specific value, from the base station (A) to the mobile telephone (B), calculating the time in the mobile telephone (B) from the received counter reading, displaying the calculated time in the mobile telephone (B), and resetting the counter reading, at the base station, if a call is not being made.

15. Method for displaying the time in a mobile telephone (B) which communicates via a base station (A), comprising the steps of:

transmitting a consecutive counter reading of a base-station (A) counter (5), which counts in a continuous loop from one specific value to another specific value, from the base station (A) to the mobile telephone (B);

calculating the time in the mobile telephone (B) from the received counter reading;

displaying the calculated time in the mobile telephone (B); the mobile telephone (B), upon receiving the counter reading from the base station (A) only once, then initializes an internal counter (12) and increments the counter reading there on the basis of information which is transmitted by the base station (A), after which the time is calculated in the mobile telephone (B) on the basis of this internal counter reading; and resetting the consecutive counter reading and, after the consecutive counter reading has been reset, the base station (A) switches off the broadcast carrier for a specific time.

16. Method according to claim 15, characterized in that the counter reading is received once by the mobile telephone (B) whenever the mobile telephone has been synchronized to the broadcast carrier of the base station.

17. Communications system having a base station (A) and at least one mobile telephone (B) having a display (8) and a time display, comprising:

a counter (5), which counts in a continuous loop from one specific value to another specific value, in the base station (A);

a transmission device (2, 4, 6) for transmitting the counter reading from the base station (A) to a mobile telephone (B), in the base station (A);

a device (1, 3) which can initialize or reset the counter reading at a specific time, in the base station (A);

a device (11, 13) for calculating the time from the received counter reading, in the mobile telephone (B); and an internal counter (12), which is initialized whenever the mobile telephone (B) has been synchronized to the broadcast carrier of the base station (A) and which increments on the basis of signals transmitted from the base station (A), in the mobile telephone (B), for providing a counter reading to said device (11, 13) also for use in calculating the time.

* * * * *

UNITED STATES PATENT AND TRADEMARK OFFICE

CERTIFICATE OF CORRECTION

PATENT NO : 5,995,846

DATED : 11/30/99

INVENTOR(S) : Jens J. Jakobsen

It is certified that error appears in the above-identified patent and that said Letters Patent is hereby corrected as shown below:

IN THE CLAIMS

In Column 5, line 23, delete "teleohone" and replace with --telephone--(Claim 8)

In Column 5, line 50, delete "times" and replace with --time,--(Claim 11)

Signed and Sealed this

Eighth Day of August, 2000

Attest:

Q. TODD DICKINSON

Attesting Officer

Director of Patents and Trademarks